April 29, 1924.

F. J. DRUAR

MOTOR VEHICLE

Filed May 17, 1917

Inventor:
Frank J. Druar,
by Willm Sibbetts
Atty.

April 29, 1924.

F. J. DRUAR

MOTOR VEHICLE

Filed May 17, 1917

Inventor:
Frank J. Druar,
by Milton Sibbetts,
Atty.

Patented Apr. 29, 1924.

1,492,288

UNITED STATES PATENT OFFICE.

FRANK J. DRUAR, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed May 17, 1917. Serial No. 169,257.

*To all whom it may concern:*

Be it known that I, FRANK J. DRUAR, a citizen of the United States, and resident of Detroit, Wayne County, State of Michigan, have invented certain new and useful Improvements in Motor Vehicles, of which the following is a specification.

This invention relates to motor vehicles and particularly to supporting or carrying means for extra wheels thereon.

One of the objects of the invention is to provide a wheel carrying means that will at once be rigid and strong and yet will permit easy and quick removal and replacement of a wheel.

Another object of the invention is to provide a strong yet light weight wheel carrying means for a motor vehicle.

Other objects of the invention will appear from the following description taken in connection with the drawings which form a part of this specification, and in which.

Figure 1:
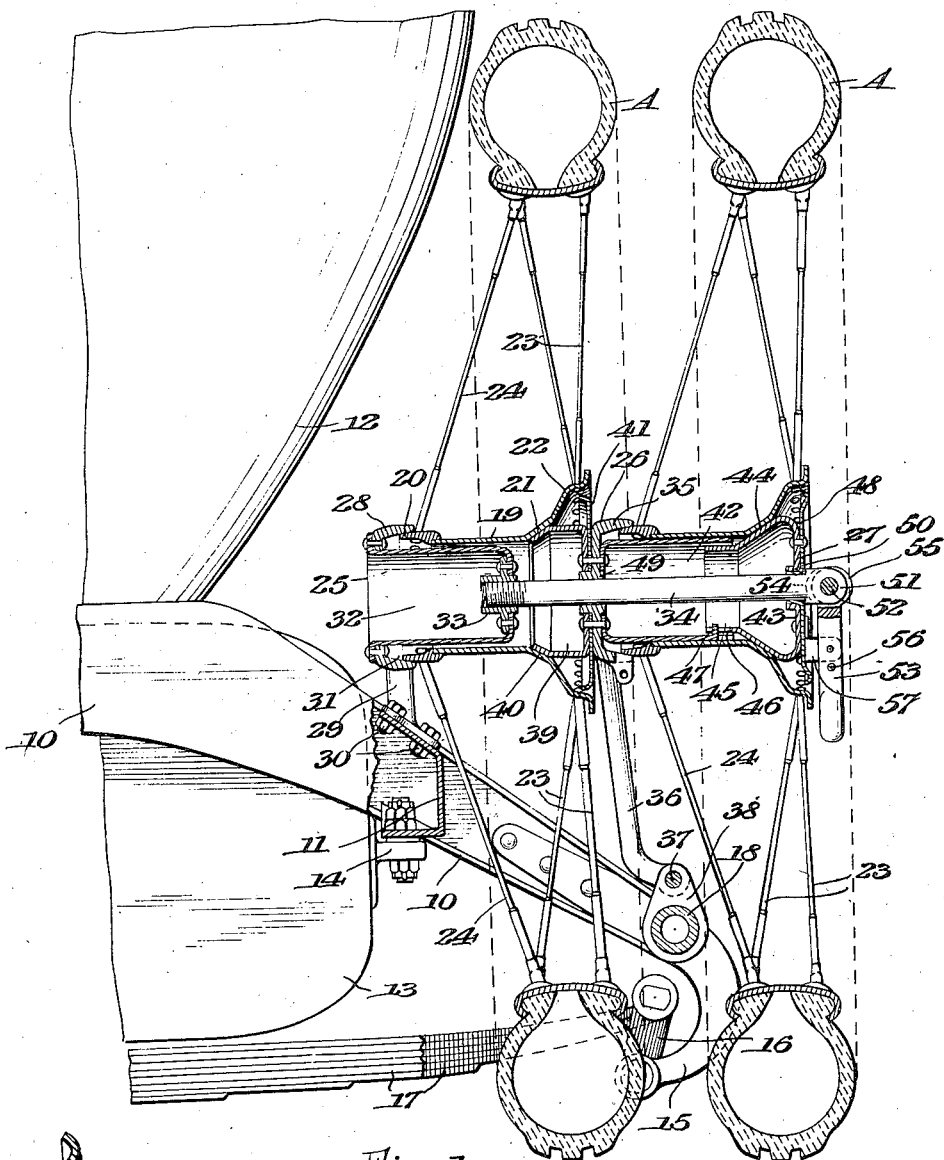
Fig. 1 is a side elevation of the rear end of a motor vehicle, with parts broken away, embodying this invention.

Referring to the drawings, 10 represents the side members of a motor vehicle frame and 11 is one of the rear cross members of the frame. The rear part of the body of the vehicle is shown at 12 as resting on the frame, and 13 is the gasolene tank which is supported from the frame, one of the supporting lugs being shown at 14 as connected to the rear cross member 11.

The side members 10 of the frame extend rearwardly beyond the cross member 11 and a bracket 15 is secured to the rear end of each side member, for the purpose of mounting the rear shackles 16 of the semielliptic springs 17. A second rear cross member 18, in the form of a tube and separated somewhat from the cross member 11, connects the extreme rear ends of the side members 10 at the brackets 15 thus adding strength and rigidity to the rear end of the vehicle frame.

Two extra wheels to be carried on the vehicle are indicated at A, A and as shown they are of the wire spoke type and each of the hubs 19 of these wheels is formed at one end (the outer end when the wheel is in place on the axle) with a cylindrical part 20 tapered somewhat on the outside to form a conical bearing surface and a part 21 adjacent the other end of the hub having a conical inner surface to co-operate with the conical outer surface on the part 20 when the wheels are secured in place on the vehicle axles. The hub 19 of each wheel is also formed adjacent the part 21 with a flared portion 22 in which the inner ends of some of the spokes 23 are secured. The inner ends of the series of spokes 24 are secured in the part 20 of the hub.

In supporting these two wheels on the vehicle as extra wheels it is desirable that they contact with their supporting means substantially as they do when in place on the axles of the vehicle. The present invention provides for such support and likewise permits of easy and quick removal from the supporting means. As shown one of the wheels A is supported at the rear end of the vehicle frame with a part of the wheel extending into the space between the frame side members 10 and the cross members 11 and 18. The other wheel A is supported contiguous to and in parallel relation with the first wheel A, the second wheel being just rearwardly of the cross member 18.

There are three separated members 25, 26 and 27 which hold the wheels in the positions above stated and as shown two of these members, 25 and 26, are connected to the vehicle frame and form the entire support for the wheels therefrom. The member 25 has a body portion 28 of ring shape and legs 29 by which it is rigidly connected to the cross member 11 as by bolts 30. The inner surface 31 of the ring 28 is slightly conical in form to receive the tapered part 20 of the hub 19 of one of the wheels A. The member 25 also has a wheel guiding part 32 which may be formed integral with the member or separately as shown, and riveted to the member 25. This guiding part 32 has two functions, first that of forming a pilot or guide for the wheel hub 19 as the latter is lifted into position so that its end 20 will be readily inserted in the ring 28, and second, it forms a socket 33 shown as threaded, to receive the inner threaded end of a clamping bolt 34 which will be more particularly hereinafter described. For the purpose of this latter function the part 32 need not extend rearwardly to the extent shown in the drawings, it only being necessary to suitably form the socket 33 so that it may receive the end of the bolt 34.

The member 26 is also shown with a body part of ring shape as at 35, and a pair of legs 36 to support the member from the cross member 18 of the frame. Instead of rigidly connecting the member 26 with the frame, this invention contemplates a movable member 26 whereby the member may be moved from its clamping position to a position which will permit the wheel A to be readily placed in the position in which it is shown in Fig. 1 of the drawings. After so positioning the wheel the member 26 may be moved into clamping position as it also is shown in Fig. 1. This movable function of the member 26 is permitted by its pivotal connection 37 with rigid collars 38 on the cross member 18. From this description it will be readily seen that the member 26 may be swung in a vertical plane out of clamping position to free the wheel A and again swung into clamping position when the wheel is in place.

The member 26, in addition to the ring part 35, also has a part 39 which extends toward the member 25 when the two members are in clamping position. This part 39 has a conical surface 40 which is adapted to co-operate with the conical surface 21 of the hub 19, and thus properly position the wheel A in substantially vertical position as it is shown in Fig. 1. There is also a disk part 41 on the member 26 which is adapted to close the flared part 22 of the wheel hub and thus keep the dirt out of that part of the hub and give a neater appearance to the outfit.

It will be understood that these various parts 35, 36, 39 and 41 of the member 26 may if desired be formed integral or some of them may be first formed separately as the parts 39 and 41 are shown in the drawings, and then riveted to the member 26. The same is true of a guide part 42 of the member 26 which guide part is similar to the guide part 32 of the member 25. This guide part 42 extends rearwardly from the member 26 and forms a pilot or guide for the second wheel A as the latter is brought into position with the end 20 of its hub in contact with the inner conical surface of the ring part 35 of the member 26.

The member 27 is not shown as attached to the frame but it is formed with a body part 43 having a conical extension 44 which is adapted to co-operate with the inner conical surface 21 of the second wheel A. There is also a part 45 which extends into the guide part 42 of the member 26 and is formed with a slot 46 which co-operates with a lug 47 on the part 42, so that the member 27 will be prevented from turning relative to the member 26. The member 27 also has a disk part 48 for closing the flared part 22 of the second wheel A.

Figure 2:
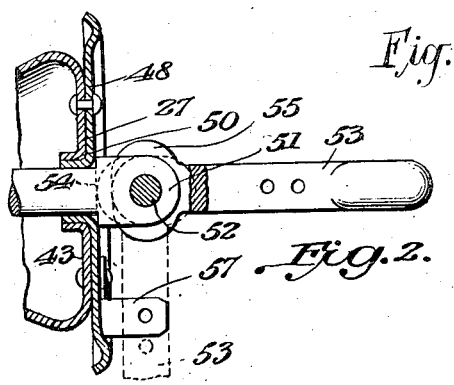
Fig. 2 is an enlarged detail view of the clamping device.

The members 26 and 27 have central openings 49 and 50 respectively which are in line with the threaded opening in the socket 33 of the member 25, and the clamping bolt 34 above referred to is adapted to pass through all three of these openings. The outer end of the bolt 34 is provided with a head 51 upon which is pivoted as at 52 a cam lever 53. There are opposite cams 54 and 55 on the cam lever 53, which cams are adapted to cooperate with the outer surface of the member 27 in clamping the three members 25, 26 and 27 together with the wheels A, A in position as shown. When the lever 53 is in its clamping position as shown in Fig. 1 and in dotted lines in Fig. 2, it may be locked as by a lock 56 to a lug 57 on the member 27.

From the above description it will be observed that the two extra wheels A, A may be supported in the upright position shown in the drawings in the following manner: With the member 26 swung rearwardly and downwardly out of the way the first wheel A may be lifted into position so that it will rest on the guide part 32 of the member 25. The member 26 may then be swung into the position in which it is shown in Fig. 1 and the second wheel A may be lifted up on to the guide part 42 of the member 26. The member 27 may then be placed in position in the hub of the second wheel A and the clamping bolt 34 may be inserted through the openings 50 and 49 and threaded into the socket 33. With the lever 53 substantially aligned with the bolt 34 to which it is pivoted said bolt may be screwed fairly tight into the socket 33 to partially clamp the wheels in place. The lever 53 may then be turned downwardly on its pivot 52 and its cam 54 will cause a further clamping action and the lever 53 may be locked to the lug 57 to prevent accidental or unauthorized unclamping of the wheels. When the bolt 34 is being screwed into the socket 33 the pin and slot connection 47 and 46 prevents the turning of the member 27, and this connection likewise prevents the unscrewing of the bolt 34 while the lever 53 is in its locked position.

Figures 6, 7:
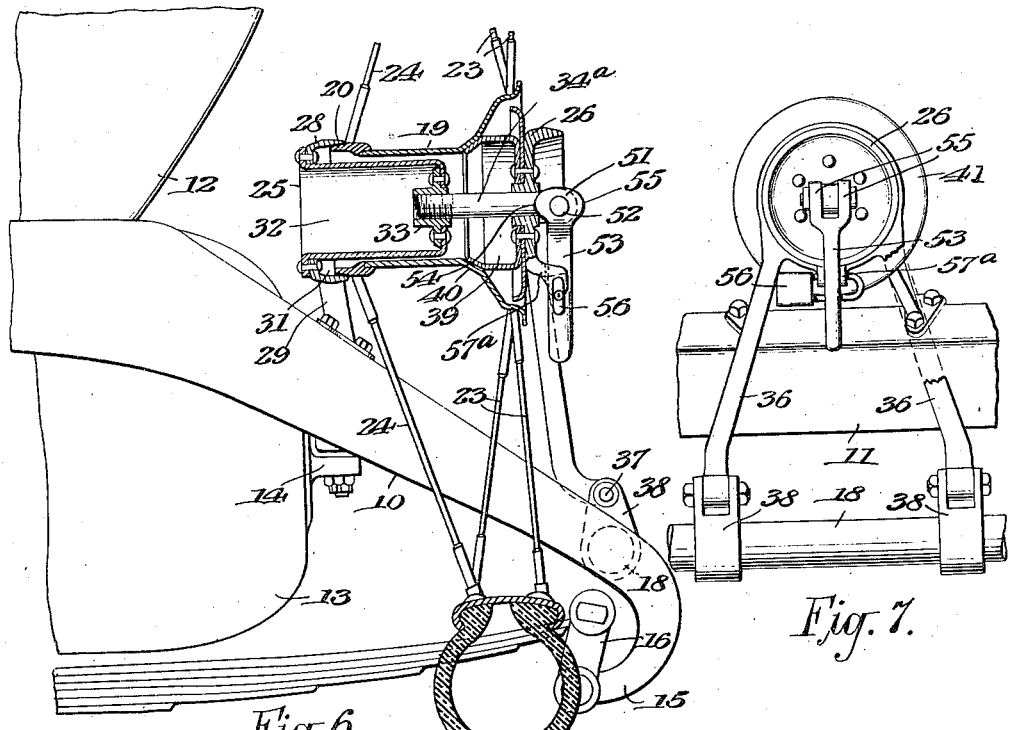
Fig. 6 is a view somewhat similar to Fig. 1 but illustrating the invention as applied to the carrying of a single wheel instead of two wheels.
Fig. 7 is a rear elevation in part of the carrier shown in Fig. 6.
Figures 3, 4, 5:
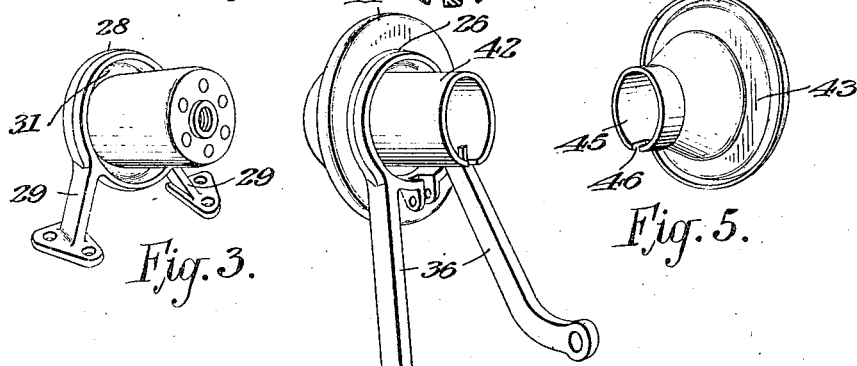
Figs. 3 and 4 are perspective views of two of the brackets which form a part of the construction shown in Fig. 1.
Fig. 5 is a perspective view of one of the parts of the wheel carrier.

In Figs. 6 and 7 a similar construction is illustrated except that the member 27 and the guide part 42 of the member 26 are entirely omitted, and the bolt 34ᵃ is shorter than shown in Fig. 1 so that it extends only to just beyond the member 26. The same clamping action of the cams 54 and 55 takes place except that they act against the member 26 instead of the member 27, and the member 26 is provided with a lug 57ª to which the lever 53 is locked. The second wheel A is of course omitted in this figure and it will be seen that the invention is adapted for supporting either one or two wheels, it being only necessary to provide two clamping bolts, one for a single wheel and one for two wheels.

It will be further understood that the invention is not limited to the exact construction shown in the drawings and that various modifications may be made without departing from the spirit or scope of the invention within the terms of the appended claims.

Having thus described my invention, what I claim and desire to secure by Letters Patent is:—

1. In combination with a vehicle, a wheel carrier comprising a fixed bracket on said vehicle having a cylindrical hub guiding member, means to receive and support the hub at the inner end thereof, and a pivoted bracket on the vehicle, a cylindrical member carried by said pivoted bracket and adapted to engage and retain said hub at the other end thereof.

2. In combination with a vehicle and side members and cross members thereof, a wheel carrier adapted to support a wheel between two side members and between two cross members, a fixed bracket having a cylindrical hub entering and guiding member and a swinging bracket having a cylindrical hub entering and abutment member.

3. In combination with a vehicle, a bracket fixed thereon at the rear end of the vehicle, a cylindrical member adapted to receive and guide the hub of a wheel, said member having a ring at its inner end to take over one end of the hub, a swinging bracket mounted on the vehicle and having an annular member adapted to enter the other end of the hub, said latter member having a part adapted to fit closely against the interior of the hub to close and support the same.

4. The combination with a pair of wheels, of a carrier therefor comprising a pivoted member arranged between the wheels, a rigid member at one side of one of the wheels, and means for clamping the wheels to said members.

5. The combination with a pair of wheels, of a carrier therefor comprising a pivoted member arranged between the wheels, a rigid member at one side of one of the wheels, and means accessible at one side of the other wheel for clamping the wheels to said members.

6. The combination with a vehicle frame and a pair of wheels arranged side by side, of a carrier for the wheels comprising a bracket supported on the frame and adapted to engage the hub of one of said wheels, a second bracket pivoted on the frame and adapted to swing in between and engage the hubs of both said wheels, and clamping means for securing the wheels to said brackets.

7. The combination with a vehicle frame and a pair of wheels arranged side by side, of a carrier for the wheels comprising a bracket supported on the frame and adapted to engage the hub of one of said wheels, a second bracket pivoted on the frame and adapted to swing in between and engage the hubs of both said wheels, and clamping means extending through the hubs of said wheels for securing the wheels to said brackets.

8. The combination with a vehicle frame and a pair of wheels arranged side by side, of a carrier for the wheels comprising a bracket supported on the frame and adapted to engage the hub of one of said wheels, a second bracket pivoted on the frame and adapted to swing in between and engage the hubs of both said wheels, and clamping means adapted to simultaneously clamp both said wheels to the brackets.

9. The combination with a vehicle frame and a pair of wheels arranged side by side, of a carrier for the wheels comprising a bracket supported on the frame and adapted to engage the hub of one of said wheels, a second bracket pivoted on the frame and adapted to swing in between and engage the hubs of both said wheels, and a clamping bolt extending through the hubs of the wheels and adapted to secure the wheels to the brackets.

10. The combination with a vehicle frame and a pair of wheels arranged side by side, of a carrier for the wheels comprising a bracket supported on the frame and adapted to engage the hub of one of said wheels, a second bracket pivoted on the frame and adapted to swing in between and engage the hubs of both said wheels, and a clamping bolt extending through the hubs of the wheels and threaded to the first said bracket to secure the wheels to the brackets.

11. In a carrier for demountable rims, the combination with a vehicle frame, of a swinging member having one end pivotally connected with the frame and having a releasable connection with said frame, and means attached to the swinging member and projecting upon both sides thereof for securing demountable rims on either side of said swinging member.

12. The combination with an automobile frame of a supporting member pivotally mounted on said frame, a hub engaging member mounted on said supporting member adapted to engage a wheel hub between said supporting member and frame, and releasable means rigidly connecting the upper end of said supporting member to said frame.

13. The combination with a vehicle frame, of a carrier comprising a swinging member having one end pivotally connected with the frame and having a releasable connection with said frame, tire supporting devices, and means attached to the swinging member and projecting on both sides thereof for securing said tire supporting devices on either side of the swinging member.

14. The combination with an automobile frame, of a carrier comprising a fixed bracket secured to said frame, a bracket pivoted to said frame, means disposed on opposite sides of said pivoted bracket for supporting tires, and means for connecting said pivoted bracket to said fixed bracket.

15. The combination with the frame of a motor vehicle, of a tire carrier comprising a member pivotally mounted on said frame, a tire support disposed between said pivoted member and a part of said frame, and releasable means extending through the tire support and connecting said pivoted member to the vehicle frame.

16. The combination with a motor vehicle frame having side members and two separated cross members, of tire carrier means mounted on said frame and comprising a bracket on each of said cross members, one of said brackets being pivoted, clamping means connecting said brackets, and means for mounting a tire supporting device on said carrier means.

17. The combination with a motor vehicle frame having side members and two separated cross members, of tire carrier means adapted to carry a tire between said cross members and comprising a rigid bracket on one of said cross members, a second bracket co-operating therewith and pivoted on the other of said cross members, releasable interconnecting means between said brackets, and means for mounting a tire support on said carrier.

18. In a carrier, the combination with a vehicle frame, of a swinging member having one end pivotally connected with the frame and having a releasable connection with said frame, and means attached to the swinging member and projecting upon both sides thereof for securing tire supporting devices on either side of said swinging member.

19. The combination with an automobile frame, of a carrier comprising a fixed bracket secured to said frame, a bracket pivoted to said frame, a tire supporting member having an opening therethrough, means carried by said pivoted bracket and extending through the opening in said tire supporting member for engaging and supporting said member, and means for connecting said pivoted bracket to said fixed bracket.

20. The combination with an automobile frame comprising side bars and a cross bar, a supporting bracket pivotally connected to said frame, a member secured to said cross bar and having a threaded opening therein, a tubular member carried by said bracket, and a bolt engaging the threaded opening in said first named member and extending through said tubular member for connecting the bracket to the frame.

21. The combination with an automobile frame, comprising side bars and a cross bar, of a supporting member pivotally connected with said frame, a member secured to said cross bar and having a boss with a threaded opening therein, a dished disk secured to said boss, a carrier tube carried by said supporting member, and a bolt co-acting with said supporting member and disposed within said tube, for rigidly connecting said supporting member to said cross bar.

22. The combination with an automobile frame, comprising side bars and a cross bar, of a supporting member pivotally connected with said frame, a member secured to said cross bar and having a threaded opening therein, a carrier tube carried by said supporting member, and a bolt co-acting with said supporting member and disposed within said tube for rigidly connecting said supporting member to said cross bar.

23. The combination with an automobile frame, comprising side bars having their rear ends extending downwardly, a cross bar and a brace rod extending between the rear ends of said side bars, of a supporting member having a pair of legs with their lower ends journaled on said brace rod and united at their upper ends, a carrier tube carried by said supporting member, and a bolt disposed within said tube and rigidly connecting said supporting member with said cross bar.

24. The combination with an automobile frame comprising side bars, a cross bar, and a brace rod extending between the rear ends of said side bars, of a supporting member having a pair of legs with their lower ends journaled on said brace rod and united at their upper ends, a member secured to said cross bar and having a cylindrical boss with a threaded opening therein and a dished disk surrounding said boss, a hub-receiving member carried by said supporting member, and a bolt co-acting with said supporting member and disposed within said hub-receiving member for rigidly connecting said supporting member to said cross bar.

25. The combination with an automobile frame comprising side bars and cross bars, of a supporting member pivotally connected with said frame, a member secured to said cross bar and having a boss with a threaded opening therein, a dished disk secured to said boss, a hub-receiving member carried by said supporting member, and a bolt co-acting with said supporting member and disposed within said hub-receiving member for rigidly connecting said supporting member to said cross bar.

26. The combination with an automobile frame comprising side bars and a cross bar, of a supporting member pivotally connected with said frame, a member secured to said cross bar and having a threaded opening therein, a hub-receiving member carried by said supporting member, and a bolt co-acting with said supporting member and disposed within said hub-receiving member, for rigidly connecting said supporting member to said cross bar.

27. The combination with an automobile frame comprising side bars having their rear ends extending downwardly, a cross bar and a brace rod extending between the rear ends of said side bars, of a supporting member having a pair of legs with their lower ends journaled on said brace rod and united at their upper ends, a hub-receiving member carried by said supporting member, and a bolt disposed within said hub-receiving member and rigidly connecting said supporting member with said cross bar.

28. The combination with an automobile frame comprising side bars and a cross bar, of a supporting member comprising a pair of legs pivotally connected with said frame at their lower ends and united at their upper ends, a hub-receiving member carried by said supporting member, and a bolt co-acting with said hub-receiving member to rigidly connect the said supporting member with said cross bar.

29. In combination with an automobile frame, a carrier supported by said frame, symmetrically arranged hub-receiving members positioned upon opposite sides of the carrier for supporting vehicle wheels, and means for rigidly securing said carrier to the frame.

30. In combination with an automobile frame, a carrier pivotally mounted upon the frame, oppositely positioned hub-receiving members located upon opposite sides of the carrier for supporting vehicle wheels, and means for rigidly securing said carrier to the frame.

In testimony whereof I affix my signature.

FRANK J. DRUAR.